United States Patent [19]

Schwartz

[11] 3,735,404
[45] May 22, 1973

[54] CROSSOVER CIRCUIT FOR MONOPULSE RADAR

[75] Inventor: Edward C. Schwartz, Cheektowaga, N.Y.

[73] Assignee: The United States of America as represented by the Secretary of the Air Force, Washington, D.C.

[22] Filed: June 7, 1965

[21] Appl. No.: 462,143

[52] U.S. Cl. .............................................343/16 M

[51] Int. Cl................................................G01s 9/22

[58] Field of Search..........................343/16 M, 16 R; 340/15.5 C

[56] References Cited

UNITED STATES PATENTS 3,427,616   2/1969   Amoruso et al.....................343/16 M

*Primary Examiner*—T. H. Tubbesing
*Attorney*—Harry A. Herbert, Jr. and James S. Shannon

EXEMPLARY CLAIM

2. Apparatus as claimed in claim 1 in which said radar system comprises in addition means for generating a range gate following each radiated pulse and in which said crossover circuit comprises in addition means connected to the last name detector, controlled by said range gate and operative during said range gate to increase said detector threshold from a preset initial value as a direct approximately linear function of range.

2 Claims, 5 Drawing Figures

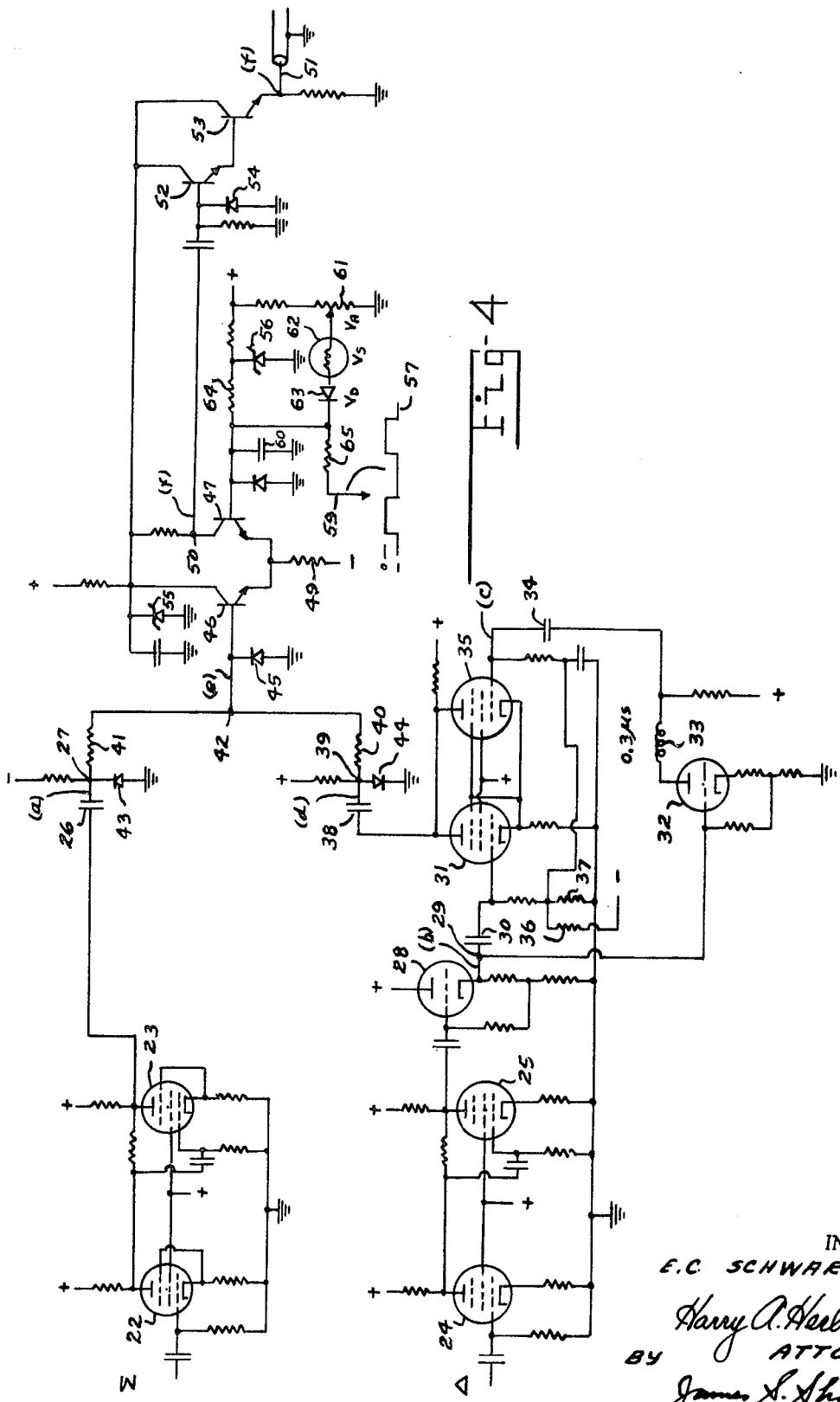

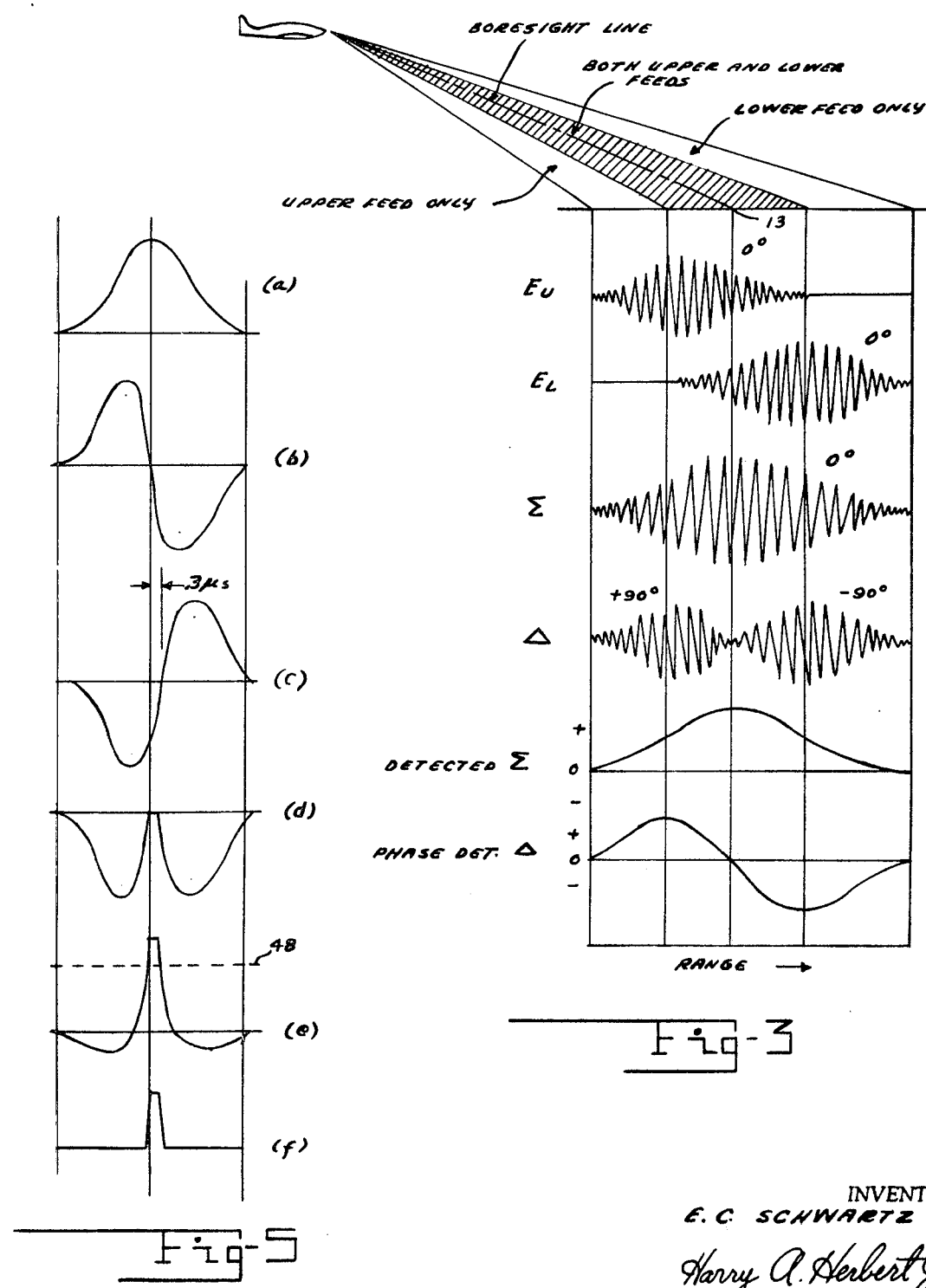

CROSSOVER CIRCUIT FOR MONOPULSE RADAR

This invention relates to the crossover circuit used to process the sum and difference returns of a monopulse radar, particularly a monopulse vertically scanning radar as used in an airborne automatic terrain following system. The purpose of the invention is to simplify the crossover circuit by reducing the frequency response requirements of the processing amplifiers while at the same time providing a more reliable response to returns from a point source such as a television tower.

The invention particularly relates to crossover circuits of the differencing or $\Sigma - k/\Delta/$ type which produce an output whenever the video difference output ($\Delta$) of the radar receiver is zero and the video sum output ($\Sigma$) is greater than a certain preset value. The $\Delta$ signal changes sign where it passes through zero. In deriving the absolute value of this signal, $/\Delta/$, the portions on either side of zero are made to have the same polarity so that the $-k/\Delta/$ signal has two lobes with a null therebetween at the point where the $\Delta$ signal passes through zero. However, as the frequency response of the processing amplifiers decreases, the null in the $-k/\Delta/$ signal tends to disappear. In accordance with the invention, a time gap about equal to the duration of the radar pulse is introduced between the two lobes of the $-k/\Delta/$ signal so that a good null is produced even with a considerably poorer amplifier frequency response. It is also found that this modification of the cross-over circuit results in a more reliable response to returns from point sources such as high towers, etc.

Figure 1:
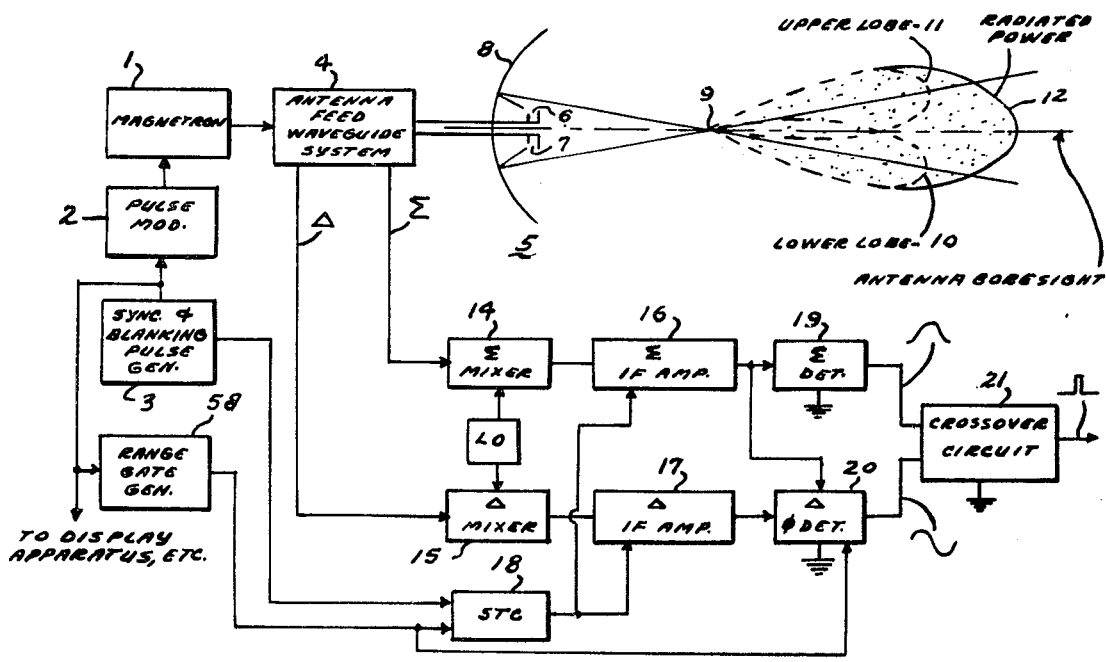
Figure 2:
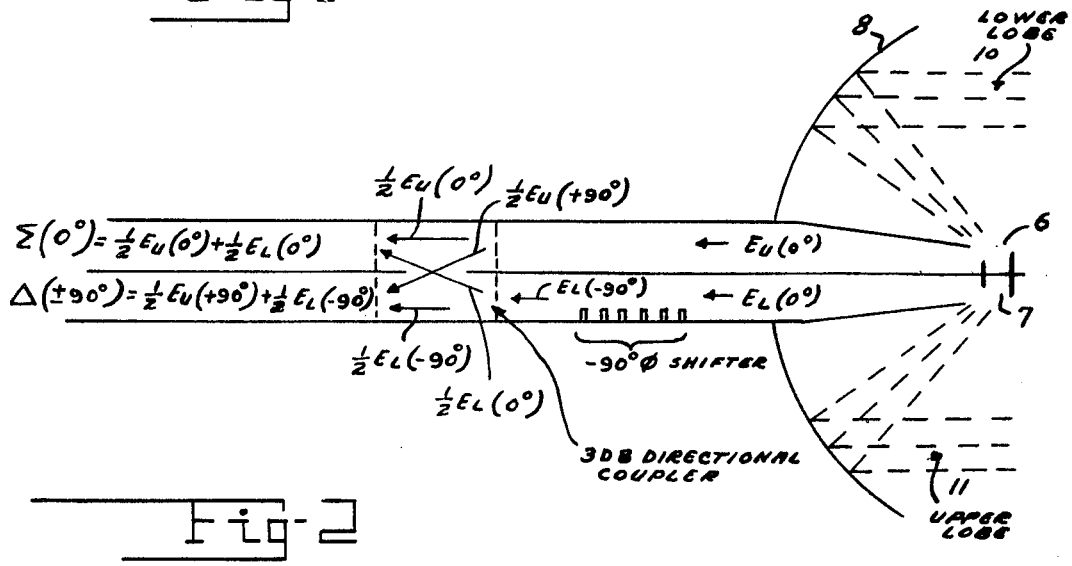

The invention will be described in more detail with reference to the specific embodiment thereof shown in the accompanying drawings in which FIG. 1 is a block diagram of a portion of a monopulse radar system showing the location in the system of the crossover circuit to which the invention relates, FIG. 2 illustrates a portion of the antenna feed waveguide system of FIG. 1, FIG. 3 is a diagram illustrating the operation of the system of FIG. 1 in producing the $\Sigma$ and $\Delta$ video outputs, FIG. 4 is a schematic diagram of a crossover circuit in accordance with the invention, and FIG. 5 shows waveforms occurring in the circuit of FIG. 4.

Referring to FIG. 1, which is a simplified showing of only so much of a monopulse radar system as is necessary to relate the crossover circuit to the system, magnetron 1, pulsed by modulator 2 under control of synchronizing pulses from generator 3, applies periodically occurring pulses of high frequency energy through antenna feed waveguide system 4 to antenna 5. These pulses, for example, may have a duration of 0.35 microsecond and occur at a rate of 3000 cps. The antenna has an upper radiating element 6, a lower radiating element 7 and a reflector 8. The feed waveguide 4 is so designed that the high frequency energy to be radiated is applied equally to elements 6 and 7 and in the same phase. Assuming the antenna to be located at point 9, the upper element 6 produces the lower lobe 10 of the antenna and lower element 7 produces the upper lobe 11. These add vectorially to produce the overall pattern 12 of the antenna. Actually, the beamwidth of the antenna pattern is only about 5° in both elevation and azimuth but is shown larger in the drawing for ease of illustration. In a terrain following system the antenna scans only in the vertical direction through about 35° but is adjustable in azimuth to compensate for the drift angle of the aircraft.

The purpose of the monopulse radar technique is an increase in resolution through an effective narrowing of the beamwidth. Thus the monopulse radar produces a sharp pulse at the output of the crossover circuit at the range measured along the boresight line at which the boresight line intersects the terrain. For instance, in FIG. 3, a sharp pulse is produced at the range of point 13 rather than an elongated pulse representing returns from all points in the area of the terrain illuminated by the antenna beam.

In carrying out the above purpose the antenna feed waveguide system 4 operates on the received signal to produce a sum, or $\Sigma$, output and a difference, or $\Delta$, output. The nature of these outputs and the manner in which they are formed in the waveguide system 4 are illustrated schematically in FIG. 2. The RF energy received through the lower lobe 10 of the antenna and upper element 6 is represented by $E_U$ and that received through the upper lobe 11 and lower element 7 is represented by $E_L$ with reference phase angles of 0°. By a process of addition and subtraction of $E_U$ and $E_L$, as indicated schematically in FIG. 2, there are produced a sum RF signal $\Sigma$ with 0° phase angle and a difference RF signal $\Delta$ with a phase angle ±90° depending upon which of the $E_U$ and $E_L$ components of the $\Delta$ signal is the greater. The $E_U$, $E_L$, and $\Sigma$ and $\Delta$ RF signals and their relationship to the antenna pattern are shown in FIG. 3.

Referring again to FIG. 1, the $\Sigma$ and $\Delta$ signals are converted in mixers 14 and 15, respectively, to IF signals which are amplified in IF amplifiers 16 and 17. The gains of the IF amplifiers are controlled as a direct function of range by STC (sensitivity time control) circuit 18 in such a manner that the outputs of amplifiers 16 and 17 are substantially independent of range. The STC circuit operates during the period defined by a range gate pulse applied thereto from range gate generator 58. This circuit also serves to apply a blanking pulse through the STC circuit to the IF amplifiers for blanking the receiver during transmission of the main radar pulse.

The IF output of amplifier 16 is detected in $\Sigma$ detector 19 to produce the $\Sigma$ video signal. The IF output of amplifier 17 is applied to phase sensitive detector 20, to which the $\Sigma$ IF is also applied as a reference phase, to produce the $\Delta$ video signal. The detected $\Sigma$ and $\Delta$ signals are also illustrated in FIG. 3. As seen in this figure, the $\Sigma$ signal has its maximum value at the range at which the boresight line of the antenna intersects the terrain, whereas the $\Delta$ signal passes through zero and changes sign at this range. The purpose of the crossover circuit 21 is to produce an output pulse when the $\Delta$ signal is zero and the $\Sigma$ signal magnitude exceeds a certain preset value.

A schematic diagram of crossover circuit 21 is shown in FIG. 4. The $\Sigma$ and $\Delta$ signals from detectors 19 and 20 (FIG. 1) are each amplified in two-stage video amplifiers comprising tubes 22–23 and 24–25, respectively. The amplified $\Sigma$ output of tube 23 is applied through capacitor 26 to point 27 where the waveform is as represented at (a) in FIG. 5. The amplified $\Delta$ output of tube 25 is coupled through cathode follower 28 to point 29 where the waveform is as represented at (b) in FIG. 5. The signal at this point is applied through capacitor 30 to the control grid of tube 31 and directly to the control grid of tube 32. The signal is inverted in phase by the latter tube and delayed in delay line 33 by 0.3 microsecond, which is approximately the duration of the radar pulse. The inverted and delayed Δ signal is then applied through capacitor 34 to the control grid of tube 35 where the waveform is as represented at (c) in FIG. 5.

Tubes 31 and 35 act as detectors and for this purpose their control grids are biased approximately to anode current cutoff by connection to a point of negative potential on the potential divider made up of resistors 36 and 37. Therefore, only the positive-going portions of the waveforms (b) and (c) cause anode current to flow in these tubes. As a result, the waveform on the anodes is as represented at (d) in FIG. 5. This is also the waveform at point 39 which is coupled to the anodes by capacitor 38. The signal at point 39 is referred to as the $k/\Delta/$ signal since it represents the absolute value of the Δ signal (b) at point 29. The constant k is a factor dependent upon the net gain in the circuit.

The Σ signal at point 27 and the $-k/\Delta/$ signal at point 39 are added, in an adding network comprising resistors 40 and 41, to produce a $\Sigma - k/\Delta/$ signal at point 42. This signal is represented by waveform (e) in FIG. 5. Diodes 43 and 44 act as direct current restorers and provide discharge paths for capacitors 26 and 38. Forward biasing is provided for each of these silicon diodes to overcome the low conduction region and provide a stable clamping level. Diode 45 is a very fast recovery type for limiting the negative swing of point 42 and thereby protecting the base-emitter junction of transistor 46 from excessive reverse voltage.

The positive portion of the $\Sigma - k/\Delta/$ signal (e) that exceeds a preset threshold 48 (FIG. 5) is detected by transistors 46 and 47. With zero signal, the base-emitter bias voltages for these transistors are such that transistor 46 is biased beyond cutoff by the amount of the preset amplitude threshold 48 and transistor 47 is conductive. When the $\Sigma - k/\Delta/$ signal drives the base of transistor 46 above this threshold the resulting transistor 46 emitter current flowing in resistor 49 raises the potential of the emitter of transistor 47 preferably to cutoff thus producing a positive pulse at the collector. This pulse is represented by the waveform (f) of FIG. 5 and is the desired crossover circuit output. This is coupled to the crossover output circuit 51 by an emitter follower circuit comprising transistors 52 and 53 and constitutes the video output of the radar receiver which may be put to any desired use dependent upon the requirements of the system. Diode 54 restores the direct current component to the signal. Zener diodes 55 and 56 provide supply voltage stabilization.

The circuit of FIG. 4 also contains means for automatically controlling the threshold of transistor 46 as a function of range so as to reduce false crossover outputs due to noise without unnecessarily rejecting weak returns from nearby targets. As a result of STC, described earlier, the gain of the receiver and therefore the noise components in the sum and difference signals increase with range. If a constant threshold were used it would have to be adjusted to a value that would clip above the noise level at maximum range. Since the short range noise level is much lower due to the reduced receiver gain, weak returns from near targets would be unnecessarily rejected. Further, returns from point targets such as towers may be inherently weak due to their small radar cross-sectional area. It is therefore desirable to increase the threshold with range in order to clip nearer to the noise level at all ranges.

It will be apparent in FIG. 4 that the threshold of transistor 46 depends upon the base potential of transistor 47. The range gate 57, which is a positive-going rectangular pulse starting, for example, 4 microseconds after the radar pulse and ending 120 microseconds after the radar pulse, is derived from range gate generator 58 (FIG. 1) and applied to conductor 59. During the interval between range gates conductor 59 is negative and capacitor 60 discharges lowering the potential of the base of transistor 47 until it reaches a voltage equal to the threshold control voltage $V_A$, derived from potentiometer 61, less the voltages $V_S$ and $V_D$ representing the drops across temperature dependent resistor 62 and diode 63. Element 62 compensates for element 63 so that $V_S + V_D$ is independent of temperature. This establishes the minimum or starting threshold of transistor 46. During the range gate, the conductor 59 is at zero potential which allows capacitor 60 to charge linearly through resistor 64 thus causing the base potential of transistor 47 and the threshold of transistor 46 to increase linearly with range for the above stated purpose.

I claim:

1. A crossover circuit for a terrain following monopulse radar system of the type in which pulses of high frequency energy are radiated by a directional antenna toward the terrain and in which there are produced from the energy reflected from the area of the terrain illuminated by the radiated energy a sum video signal having a maximum value at the range at which the boresight line of said antenna intersects the terrain and a difference video signal that is zero at said range and has portions of opposite polarities on either side thereof, said crossover circuit comprising: means for applying said difference signal to first and second channels in parallel; said first channel containing means for detecting and inverting the positive portion of said difference signal; said second channel containing means for inverting said difference signal, means for delaying the inverted signal by an amount approximately equal to the duration of said radiated pulses and means for detecting and inverting the positive portion of the delayed inverted difference signal; means for adding said sum signal to the outputs of said first and second channels; a detector having a preset threshold; and means for applying the signal resulting from said addition to the last named detector, whereby a detector output is produced whenever the applied signal exceeds said threshold, said output constituting the output of said crossover circuit.

2. Apparatus as claimed in claim 1 in which said radar system comprises in addition means for generating a range gate following each radiated pulse and in which said crossover circuit comprises in addition means connected to the last named detector, controlled by said range gate and operative during said range gate to increase said detector threshold from a preset initial value as a direct approximately linear function of range.

* * * * *